(12) United States Patent
Xu et al.

(10) Patent No.: US 10,883,813 B2
(45) Date of Patent: Jan. 5, 2021

(54) SENSOR FOR DETECTING A BENDING, FLEXIBLE DISPLAY APPARATUS, AND METHOD OF DETECTING BENDING IN FLEXIBLE DISPLAY APPARATUS

(71) Applicants: BOE TECHNOLOGY GROUP CO., LTD., Beijing (CN); Beijing BOE Display Technology Co., Ltd., Beijing (CN)

(72) Inventors: Wenpeng Xu, Beijing (CN); Hui Zhao, Beijing (CN); Zhibo Zhang, Beijing (CN)

(73) Assignees: BOE TECHNOLOGY GROUP CO., LTD., Beijing (CN); Beijing BOE Display Technology Co., Ltd., Beijing (CN)

( * ) Notice: Subject to any disclaimer, the term of this patent is extended or adjusted under 35 U.S.C. 154(b) by 365 days.

(21) Appl. No.: 15/769,919

(22) PCT Filed: Nov. 23, 2017

(86) PCT No.: PCT/CN2017/112557
§ 371 (c)(1),
(2) Date: Apr. 20, 2018

(87) PCT Pub. No.: WO2018/214433
PCT Pub. Date: Nov. 29, 2018

(65) Prior Publication Data
US 2020/0240763 A1 Jul. 30, 2020

(30) Foreign Application Priority Data
May 23, 2017 (CN) .......................... 2017 1 0370150

(51) Int. Cl.
*G01B 7/16* (2006.01)
*G01B 7/28* (2006.01)
*G09F 9/30* (2006.01)

(52) U.S. Cl.
CPC ................. *G01B 7/18* (2013.01); *G01B 7/28* (2013.01); *G09F 9/301* (2013.01)

(58) Field of Classification Search
CPC ........... G01B 7/18; G01B 7/28; G06F 1/1652; G09F 9/301
(Continued)

(56) References Cited

U.S. PATENT DOCUMENTS

2013/0100053 A1* 4/2013 Kang ........................ G06F 3/03
345/173
2014/0035869 A1* 2/2014 Yun ......................... G06F 3/045
345/174

(Continued)

FOREIGN PATENT DOCUMENTS

CN 104318861 A 1/2015
CN 204255285 U 4/2015
(Continued)

OTHER PUBLICATIONS

International Search Report & Written Opinion dated Feb. 23, 2018, regarding PCT/CN2017/112557.

*Primary Examiner* — Christopher E Mahoney
(74) *Attorney, Agent, or Firm* — Intellectual Valley Law, P.C.

(57) ABSTRACT

The present application discloses a sensor for detecting a bending in a flexible display apparatus. The sensor includes a first flexible base substrate, and a first electrode layer on a side of the first flexible base substrate. The first electrode layer includes an array of a plurality of first electrodes configured to detect a first bending toward a first bent (Continued)

direction relative to a surface of the first flexible base substrate.

18 Claims, 7 Drawing Sheets

(58) Field of Classification Search
USPC .......................................................... 324/699
See application file for complete search history.

(56) References Cited

U.S. PATENT DOCUMENTS

| | | | |
|---|---|---|---|
| 2015/0116608 A1* | 4/2015 | Jeong | G06F 3/044 |
| | | | 349/12 |
| 2015/0128728 A1* | 5/2015 | Salo | G06F 1/1626 |
| | | | 73/862.626 |
| 2016/0254328 A1 | 9/2016 | Song | |
| 2017/0048965 A1* | 2/2017 | Cho | G01B 7/20 |

FOREIGN PATENT DOCUMENTS

| | | | |
|---|---|---|---|
| CN | 104880144 A | * | 6/2015 |
| CN | 105091833 A | | 11/2015 |
| CN | 105096752 A | | 11/2015 |
| CN | 106782093 A | | 5/2017 |
| JP | 2013005403 A | | 1/2013 |
| KR | 20140095313 A | | 8/2014 |

* cited by examiner

SENSOR FOR DETECTING A BENDING, FLEXIBLE DISPLAY APPARATUS, AND METHOD OF DETECTING BENDING IN FLEXIBLE DISPLAY APPARATUS

CROSS-REFERENCE TO RELATED APPLICATION

This application is a national stage application under 35 U.S.C. § 371 of International Application No. PCT/CN2017/112557, filed Nov. 23, 2017, which claims priority to Chinese Patent Application No. 201710370150.5, filed May 23, 2017, the contents of which are incorporated by reference in the entirety.

TECHNICAL FIELD

The present invention relates to display technology, more particularly, to a sensor for detecting a bending, a flexible display apparatus, and a method of detecting a bending in a flexible display apparatus.

BACKGROUND

A flexible display apparatus is a bendable or deformable display apparatus having a flexible display panel. Examples of flexible display apparatuses include a flexible organic light emitting diode (OLED) display apparatus, a flexible electrophoretic display (EPI)) apparatus, and a flexible liquid crystal display (LCD) apparatus. As a new generation display apparatus, the flexible display apparatus is thinner and lighter, having high contrast, high responsiveness, and high brightness. It also provides full color and a wide viewing angle. The flexible display apparatus has found a wide range of applications in mobiles phones, personal digital assistance (PDAs), digital cameras, on-board displays, notebook computers, on-wall televisions, as well as various military applications.

SUMMARY

In one aspect, the present invention provides a sensor for detecting a bending in a flexible display apparatus, comprising a first flexible base substrate; and a first electrode layer on a side of the first flexible base substrate and comprising an array of a plurality of first electrodes configured to detect a first bending toward a first bent direction relative to a surface of the first flexible base substrate; wherein the sensor has a first configuration corresponding to the first flexible base substrate in a substantially unbent state and a second configuration corresponding to the first flexible base substrate in a first bent state in which at least a portion of the first flexible base substrate is bent toward the first bent direction; the plurality of first electrodes are insulated from each other in a state corresponding to the first configuration; and at least two adjacent first electrodes of the plurality of first electrodes are electrically connected to each other in a state corresponding to the second configuration.

Optionally, the plurality of first electrodes are a plurality of first electrode probes, each of which extending away from a first side of the first flexible base substrate; the plurality of first electrode probes are spaced apart from each other in the state corresponding to the first configuration: and at least two adjacent first electrode probes of the plurality of first electrode probes are in contact with each other in the state corresponding to the second configuration.

Optionally, the sensor further comprises a detection circuit electrically connected to the plurality of first electrodes; wherein the detection circuit is configured to detect a bending position and a bending direction by detecting an electrical signal from the at least two adjacent first electrodes of the plurality of first electrodes electrically connected to each other in the state corresponding to the second configuration.

Optionally, the detection circuit comprises a first voltage terminal and a short circuit detection terminal; the detection circuit is configured to scan the plurality of first electrodes one by one with a first voltage signal transmitted from the first voltage terminal; and the short circuit detection terminal is configured to detect voltage levels at the plurality of first electrodes.

Optionally, the detection circuit further comprises a memory storing relative positions of the plurality of first electrodes; and the detection circuit is configured to determine the bending position of the first bending toward the first bent direction based on the voltage levels detected at the plurality of first electrodes and the relative positions of the plurality of first electrodes.

Optionally, the sensor further comprises a second flexible base substrate; and a second electrode layer on a side of the second flexible base substrate, insulated from the first electrode layer, and comprising an array of a plurality of second electrodes configured to detect a second bending toward a second bent direction relative to the surface of the second flexible base substrate; wherein the sensor has a third configuration corresponding to the second flexible base substrate in a second bent state in which at least a portion of the second flexible base substrate is bent toward the second bent direction; the plurality of second electrodes are insulated from each other in a state corresponding to the first configuration; and at least two adjacent second electrodes of the plurality of second electrodes are electrically connected to each other in a state corresponding to the third configuration.

Optionally, the plurality of second electrodes are a plurality of second electrode probes, each of which extending away front a second side of the second flexible base substrate; the plurality of second electrode probes are spaced apart from each other in the state corresponding to the first configuration; at least two adjacent second electrode probes of the plurality of second electrode probes are in contact with each other in the state corresponding to the third configuration.

Optionally, the second flexible base substrate and the first flexible base substrate are integrated as a single flexible base substrate; and the first electrode layer and the second electrode layer are on two opposite sides of the single flexible base substrate.

Optionally, the sensor further comprises a detection circuit electrically connected to the plurality of first electrodes and the plurality of second electrodes; wherein the detection circuit is configured to detect a bending position and a bending direction by detecting one or a combination of a first electrical signal from the at least two adjacent first electrodes of the plurality of first electrodes electrically connected to each other in the state corresponding to the second configuration, and a second electrical signal from the at least two adjacent second electrodes of the plurality of second electrodes electrically connected to each other in the state corresponding to the third configuration.

Optionally, the plurality of first electrodes are insulated from each other in a state corresponding to the third configuration; and the plurality of second electrodes are insulated from each other in a state corresponding to the second configuration.

Optionally, the second bent direction is substantially opposite to the first bent direction.

Optionally, the detection circuit comprises a first voltage terminal and a short circuit detection terminal; the detection circuit is configured to scan the plurality of second electrodes one by one with a first voltage signal transmitted from the first voltage terminal; and the short circuit detection terminal is configured to detect voltage levels at the plurality of second electrodes.

Optionally, the detection circuit further comprises a memory storing relative positions of the plurality of second electrodes; and the detection circuit is configured to determine the bending position of the second bending toward the second bent direction based on the voltage levels detected at the plurality of second electrodes and the relative positions of the plurality of second electrodes.

Optionally, the first flexible base substrate is a flexible film.

In another aspect, the present invention provides a flexible display apparatus comprising the sensor described herein or fabricated by a method described herein.

Optionally, the flexible display apparatus further comprises a display unit and a flexible touch panel on the display unit; wherein the sensor is between the flexible touch panel and the display unit.

In another aspect, the present invention provides a method of detecting a bending in a flexible display apparatus, comprising providing the sensor as set forth above in the flexible display apparatus; scanning the plurality of first electrodes one by one with a first voltage signal; and detecting voltage levels of the plurality of first electrodes; wherein a single one of the plurality first electrodes is detected to have a first voltage level at any moment when the plurality of first electrodes are scanned with the first voltage signal, and the first flexible base substrate is determined to be in the substantially unbent state; and at least two adjacent first electrodes of the plurality of first electrodes are detected to have the first voltage level when the plurality of first electrodes are scanned with the first voltage signal, and the first flexible base substrate is determined to be in the first bent state thereby detecting a bending position corresponding to the first bent direction.

Optionally, the first voltage level is a high voltage level provided by the first voltage signal.

Optionally, the sensor further comprises a second flexible base substrate, and a second electrode layer on a side of the second flexible base substrate, insulated from the first electrode layer, and comprising an array of a plurality of second electrodes configured to detect a second bending toward a second bent direction relative to the surface of the second flexible base substrate; wherein the sensor has a third configuration corresponding to the second flexible base substrate in a second bent state in which at least a portion of the second flexible base substrate is bent toward the second bent direction; the plurality of second electrodes are insulated from each other in a state corresponding to the first configuration; and at least two adjacent second electrodes of the plurality of second electrodes are electrically connected to each other in a state corresponding to the third configuration; the method further comprising scanning the plurality of second electrodes one by one with the first voltage signal; and detecting voltage levels of the plurality of second electrodes; wherein a single one of the plurality second electrodes is detected to have the first voltage level at any moment when the plurality of second electrodes are scanned with the first voltage signal, and the second flexible base substrate is determined to be in the substantially unbent state; and at least two adjacent second electrodes of the plurality of second electrodes are detected to have the first voltage level when the plurality of second electrodes are scanned with the first voltage signal, and the second flexible base substrate is determined to be in the second bent state thereby detecting a bending position corresponding to the second bent direction.

Optionally, the second flexible base substrate and the first flexible base substrate are integrated as a single flexible base substrate; and the first electrode layer and the second electrode layer are formed on two opposite sides of the single flexible base substrate.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional flexible display apparatus, detection of bending of the flexible display apparatus is typically based on detection of pressure or uses an optical-based mechanism. The conventional pressure-based or optical-based methods cannot accurately detect bending of the flexible display apparatus. For example, these detection methods cannot easily distinguish a touch action on the surface of the flexible display apparatus from a true bending deformation of the flexible display apparatus, resulting in false positives in detecting bending of the flexible display apparatus. Moreover, a bending direction (e.g., upward bending or downward bending) cannot be distinguished by the conventional detection methods. Further, the accuracy of these conventional methods is often affected by ambient temperature. Due to these shortcomings, the conventional flexible apparatuses are not suitable for user interaction.

Accordingly, the present disclosure provides, inter al/a, a sensor for detecting a bending, a flexible display apparatus, and a method of detecting a bending in a flexible display apparatus that substantially obviate one or more of the problems due to limitations and disadvantages of the related art. In one aspect, the present disclosure provides a sensor for detecting a bending in a flexible display apparatus. In some embodiments, the sensor includes a first flexible base substrate and a first electrode layer on a first side of the first flexible base substrate. Optionally, the first electrode layer includes an array of a plurality of first electrodes configured to detect a first bending toward a first bent direction relative to a surface of the first flexible base substrate. Optionally, the sensor has a first configuration corresponding to the first flexible base substrate in a substantially unbent state and a second configuration corresponding to the first flexible base substrate in a first bent state in which at least a portion of the first flexible base substrate is bent toward the first bent direction. Optionally, the plurality of first electrodes are insulated from each other in a state corresponding to the first configuration. Optionally, at least two adjacent first electrodes of the plurality of first electrodes are electrically connected to each other in a state corresponding to the second configuration.

Figure 1:
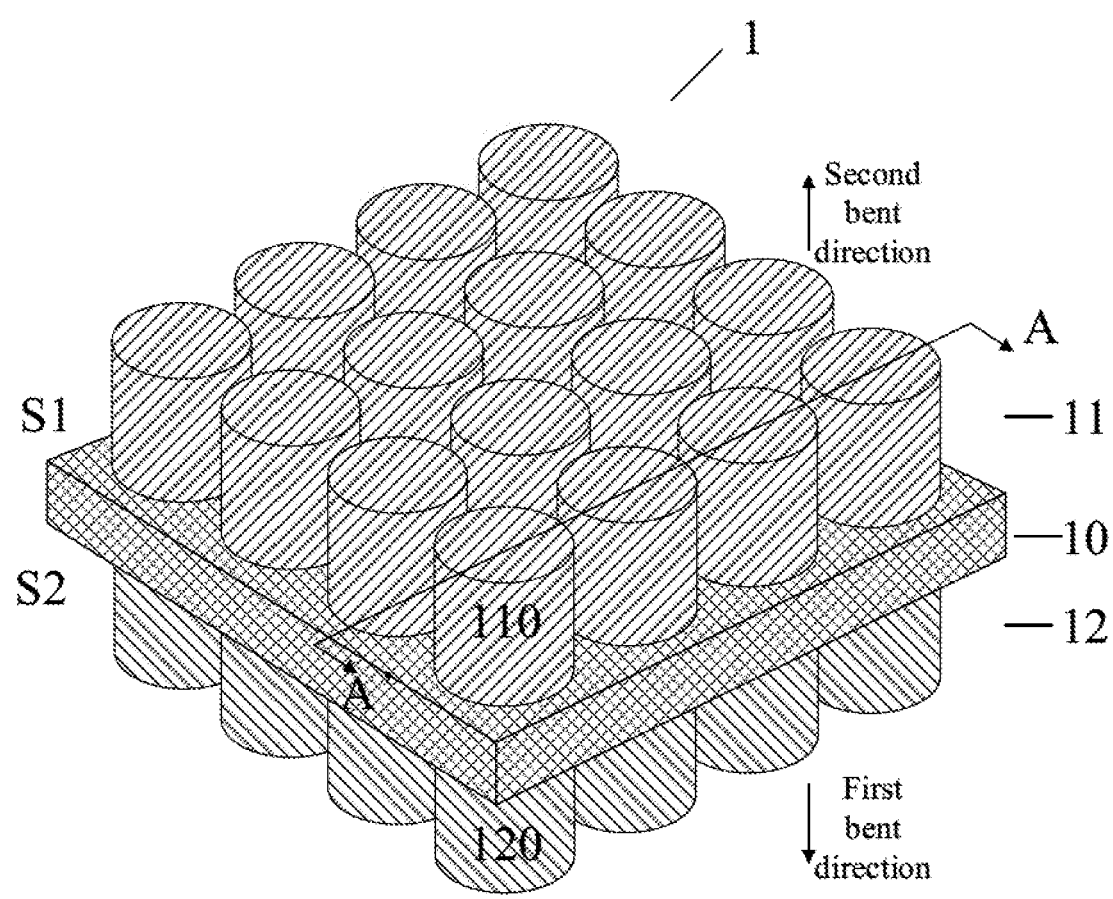
FIG. 1 is a schematic diagram illustrating the structure of a sensor for detecting a bending in some embodiments according to the present disclosure.

FIG. 1 is a schematic diagram illustrating the structure of a sensor for detecting a bending in some embodiments according to the present disclosure. Referring to FIG. 1, the sensor 1 in some embodiments includes a flexible base substrate 10, a first electrode layer 11 on a first side S1 of the flexible base substrate 10, and a second electrode layer 12 on a second side S2 opposite to the first side S1 of the flexible base substrate 10. The second electrode layer 12 is insulated from the first electrode layer 11, e.g., by the flexible base substrate 10. The first electrode layer 11 includes an array of a plurality of first electrodes 110 configured to detect a first bending toward a first bent direction relative to a surface of the flexible base substrate 10. The second electrode layer 12 includes an array of a plurality of second electrodes 120 configured to detect a second bending toward a second bent direction relative to the surface of the flexible base substrate 10.

Figure 2:
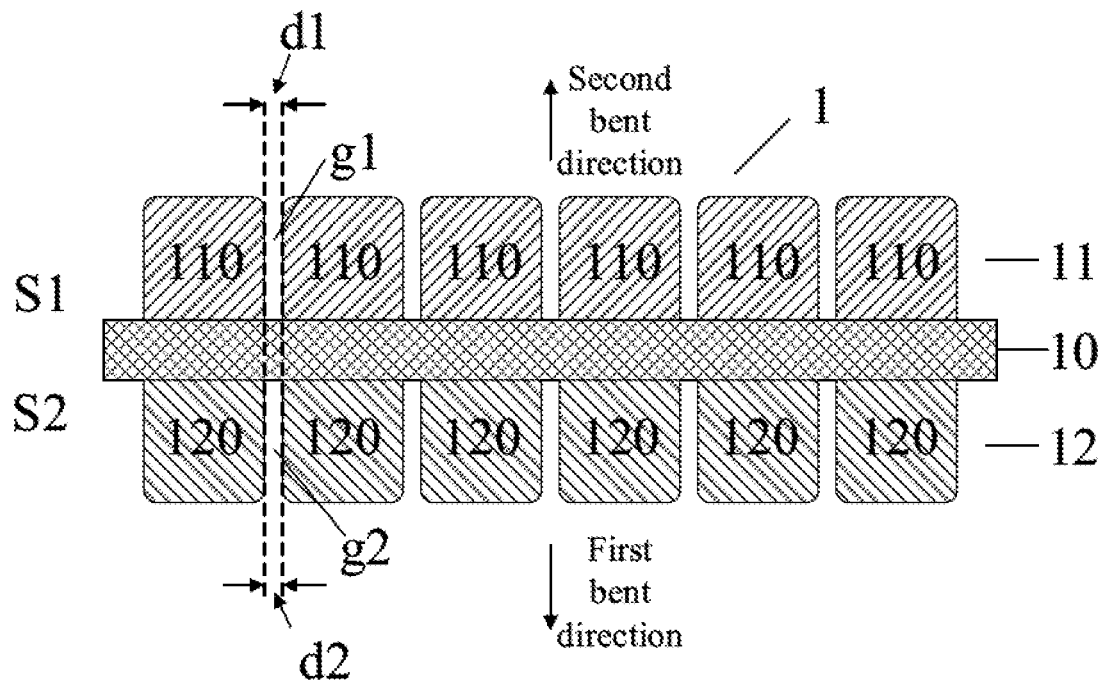
FIG. 2 is a cross-sectional view along line A-A' of FIG. 1 in a sensor for detecting a bending in a substantially unbent state.

FIG. 2 is a cross-sectional view along line A-A' of FIG. 1 in a sensor for detecting a bending in a substantially unbent state. Referring to FIG. 2, in some embodiments, the sensor 1 has a first configuration corresponding to the flexible base substrate 10 in a substantially unbent state. Optionally, the plurality of first electrodes 110 are insulated from each other in a state corresponding to the first configuration, and the plurality of second electrodes 120 are insulated from each other in a state corresponding to the first configuration. As shown in FIG. 2, in some embodiments, the plurality of first electrode 110 are spaced apart (e.g., by a first gap g1) from each other in the state corresponding to the first configuration, and the plurality of second electrode 120 are spaced apart (e.g., by a second gap g2) from each other in the state corresponding to the first configuration. Optionally, the first gap g1 has an average gap distance d1 in a range of approximately 10 μm to approximately 1 mm, e.g., approximately 10 μm to approximately 100 μm, approximately 100 μm to approximately 200 μm, approximately 200 μm to approximately 400 μm, approximately 400 μm to approximately 600 μm, approximately 600 μm to approximately 800 μm, and approximately 800 μm to approximately 1 min. Optionally, the second gap g2 has an average gap distance d2 in a range of approximately 10 μm to approximately 1 mm, e.g., approximately 10 μm to approximately 100 μm, approximately 100 μm to approximately 200 μm, approximately 200 μm to approximately 400 μm, approximately 400 μm to approximately 600 μm, approximately 600 μm to approximately 800 μm, and approximately 800 μm to approximately 1 mm.

Various appropriate conductive materials may be used for making the plurality of first electrodes 110 and the plurality of second electrodes 120. Examples of conductive materials suitable for making the plurality of first electrodes 110 and the plurality of second electrodes 120 include metals, alloys, nanocarbon tubes, graphene, metal oxides, and so on. Optionally, the plurality of first electrodes 110 and the plurality of second electrodes 120 are made of a transparent conductive material, e.g., indium tin oxide.

The plurality of first electrodes 110 and the plurality of second electrodes 120 may have various appropriate shapes and/or dimensions, Exemplary shapes include a rod shape, a cubic shape, a cylindrical shape, a rectangular prism shape, a pyramid shape, a cone shape, a triangular prism shape, a spherical shape, and so on. Optionally, the plurality of first electrodes 110 are a plurality of first electrode probes, each of which extending away from the first side S1 of the flexible base substrate 10. Optionally, the plurality of second electrodes 120 are a plurality of second electrode probes, each of which extending away from the second side S2 of the flexible base substrate 10.

Figure 3:
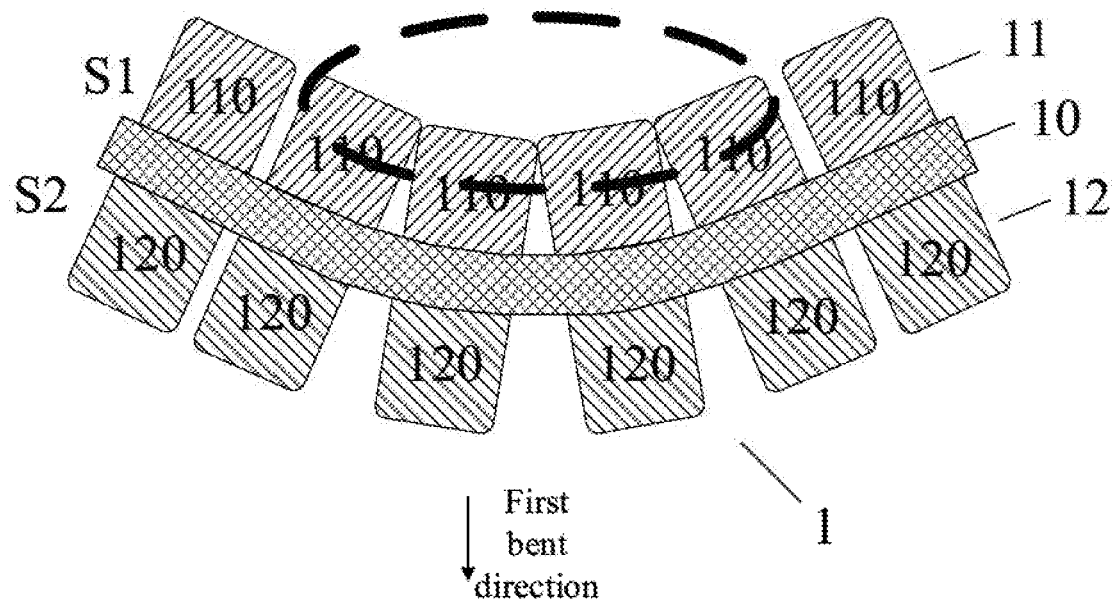
FIG. 3 is a cross-sectional view along line A-A' of FIG. 1 in a sensor for detecting a bending in a first bent state.

FIG. 3 is a cross-sectional view along line A-A' of FIG. 1 in a sensor for detecting a bending in a first bent state. Referring to FIG. 3, in some embodiments, the sensor 1 has a second configuration corresponding to the flexible base substrate 10 in a first bent state in which at least a portion of the flexible base substrate 10 is bent toward the first bent direction. Optionally, at least two adjacent first electrodes (e.g., first electrodes encircled by the dotted line in FIG. 3) of the plurality of first electrodes 110 are electrically connected to each other in a state corresponding to the second configuration. Optionally, at least two (e.g., at least 4, at least 6, at least 8, at least 10) adjacent first electrodes of the plurality of first electrodes 110 are in contact with each other in the state corresponding to the second configuration. Optionally, in the state corresponding to the second configuration, the plurality of second electrodes 120 on an opposite side of the flexible base substrate 10 remain insulated from each other, e.g., spaced apart from each other by a second gap with an increased gap distance.

Figure 4:
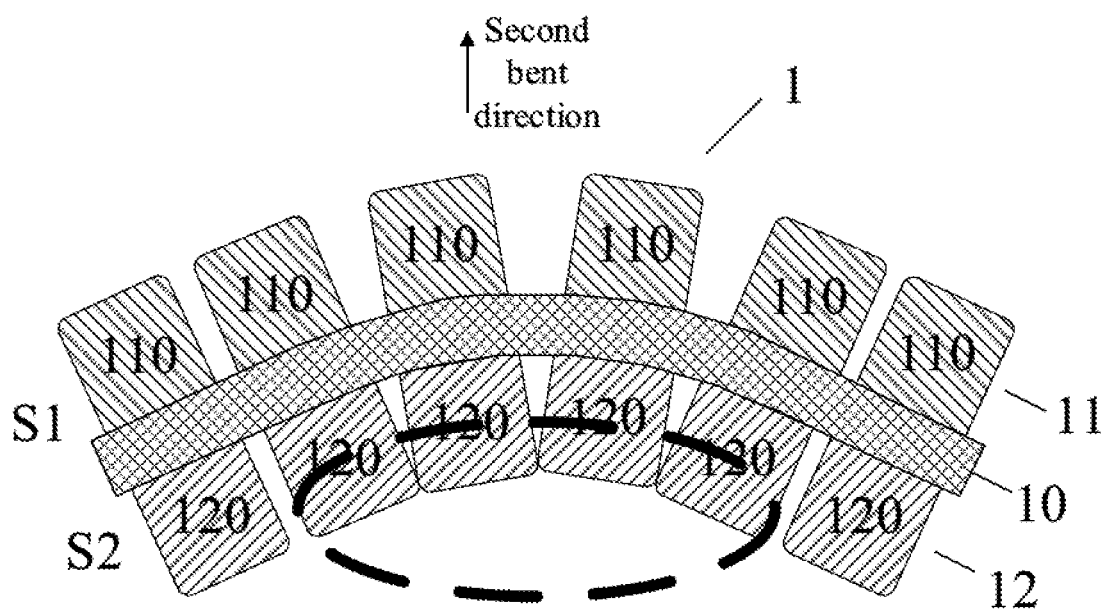
FIG. 4 is a cross-sectional view along line A-A' of FIG. 1 in a sensor for detecting a bending in a second bent state.

FIG. 4 is a cross-sectional view along line A-A' of FIG. 1 in a sensor for detecting a bending in a second bent state. Referring to FIG. 4, in some embodiments, the sensor 1 has a thud configuration corresponding to the flexible base substrate 10 in a second bent state in which at least a portion of the flexible base substrate 10 is bent toward the second bent direction. Optionally, at least two adjacent second electrodes (e.g., second electrodes encircled by the dotted line in FIG. 4) of the plurality of second electrodes 120 are electrically connected to each other in a state corresponding to the third configuration. Optionally, at least two (e.g., at least 4, at least 6, at least 8, at least 10) adjacent second electrodes of the plurality of second electrodes 120 are in contact with each other in the state corresponding to the third configuration. In the state corresponding to the third configuration, the plurality of first electrodes 110 on an opposite side of the flexible base substrate 10 remain insulated from each other, e.g., spaced apart from each other by a first gap with an increased gap distance.

In some embodiments, when the flexible base substrate 10 is substantially unbent, the entire sensor 1 is in the first configuration. When one or more portions of the flexible base substrate 10 are bent, the sensor 1 may have one or more regions in the first configuration, and one or more regions in a configuration other than the first configuration. Optionally, the sensor 1 has one or more regions in the first configuration, and one or more regions in the second configuration (in which the flexible base substrate 10 is bent toward the first bent direction). Optionally, the sensor 1 has one or more regions in the first configuration, and one or more regions in the third configuration (in which the flexible base substrate 10 is bent toward the second bent direction). Optionally, the sensor 1 has one or more regions in the first configuration, one or more regions in the second configuration, and one or more regions in the third configuration.

Optionally, the second bent direction is substantially opposite to the first bent direction.

In some embodiments, the sensor 1 is an integrated sensor. Optionally, the plurality, of first electrodes 110 and the plurality of second electrodes 120 in contact with (e.g., attached to) a same flexible base substrate (e.g., the first flexible base substrate 10).

Figure 5:
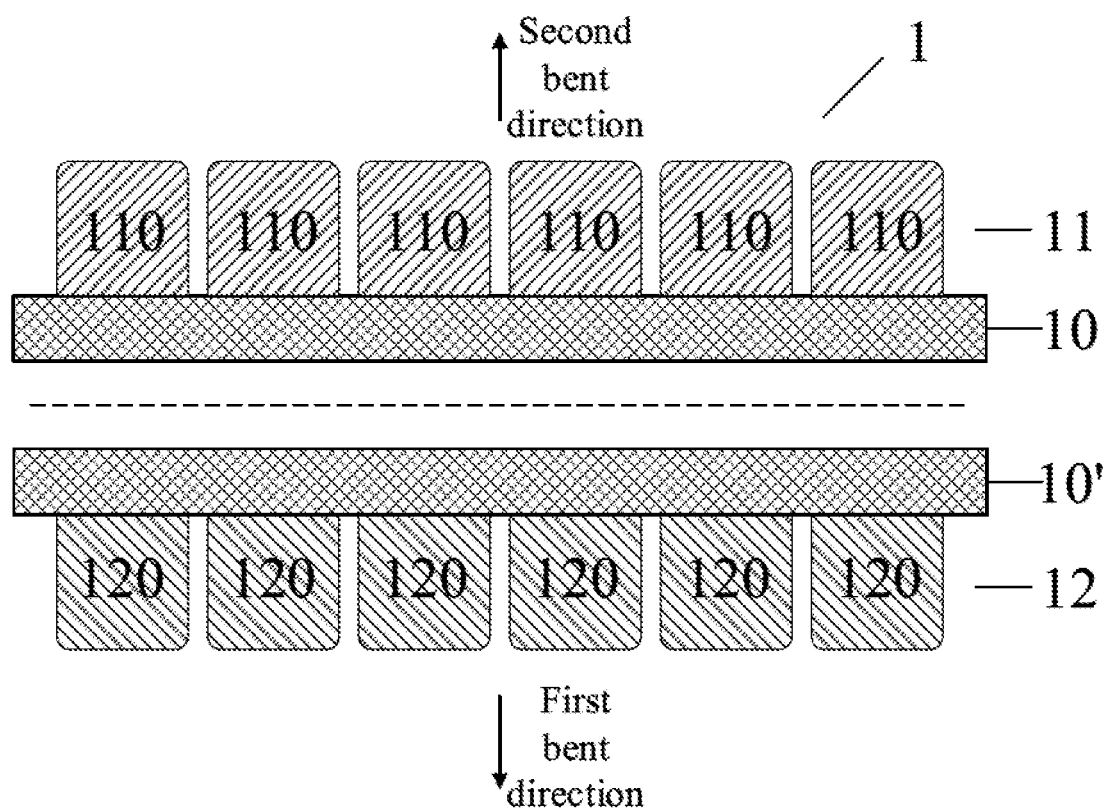
FIG. 5 is a schematic diagram illustrating the structure of a sensor for detect ng a bending in some embodiments according to the present disclosure.

In some embodiments, the plurality of first electrodes 110 are attached to the flexible base substrate 10, and the sensor 1 further includes a second flexible base substrate different from the flexible base substrate 10, on to which the plurality of second electrodes 120 are attached. Optionally, the flexible base substrate 10 and the second flexible base substrate 10' are adjacent to each other. Optionally, the flexible base substrate 10 and the second flexible base substrate 10' are separated from each other, e.g., disposed in two separate layers. FIG. 5 is a schematic diagram illustrating the structure of a sensor for detecting a bending in some embodiments according to the present disclosure. Referring to FIG. 5, the sensor 1 includes a flexible base substrate 10 and the plurality of first electrodes 110 on the flexible base substrate 10. The sensor 1 further includes a second flexible base substrate 10' and the plurality of second electrodes 120 on the second flexible base substrate 10'. The flexible base substrate 10 and the second flexible base substrate 10' are separated from each other. Optionally, the flexible base substrate 10 and the second flexible base substrate 10' are contact with each other.

Optionally, the flexible base substrate 10 is a flexible film. Optionally, the second flexible base substrate 10' is a flexible film. Examples of appropriate flexible materials far making the flexible base substrate 10 and the second flexible base substrate 10' include flexible polymers such as polyimide.

In some embodiments, a bending position and a bending direction of the flexible base substrate 10 can be detected by detecting one or a combination of (1) a first electrical signal from the at least two adjacent first electrodes of the plurality of first electrodes 110 electrically connected to each other in the state corresponding to the second configuration; and (2) a second electrical signal from the at least two adjacent second electrodes of the plurality of second electrodes 120 electrically connected to each other in the state corresponding to the third configuration.

Optionally, the first electrical signal is different from an electrical signal detected from multiple first electrodes of the plurality of first electrodes 110 that are insulated from each other and insulated from the at least two adjacent first electrodes electrically connected to each other. By detecting a first electrical signal from a bent region different from an electrical signal from a surrounding unbent region, a bending in the flexible base substrate 10 can be detected.

Optionally, the second electrical signal is different from an electrical signal detected from multiple second electrodes of the plurality of second electrodes 120 that are insulated from each other and insulated from the at least two adjacent second electrodes electrically connected to each other. By detecting a second electrical signal from a bent region different from an electrical signal from a surrounding unbent region, a bending in the flexible base substrate 10 can be detected.

Optionally, the first electrical signal is a voltage signal. Optionally, the first electrical signal is a current signal. Optionally, the second electrical signal is a voltage signal. Optionally, the second electrical signal is a current signal.

Figure 6:
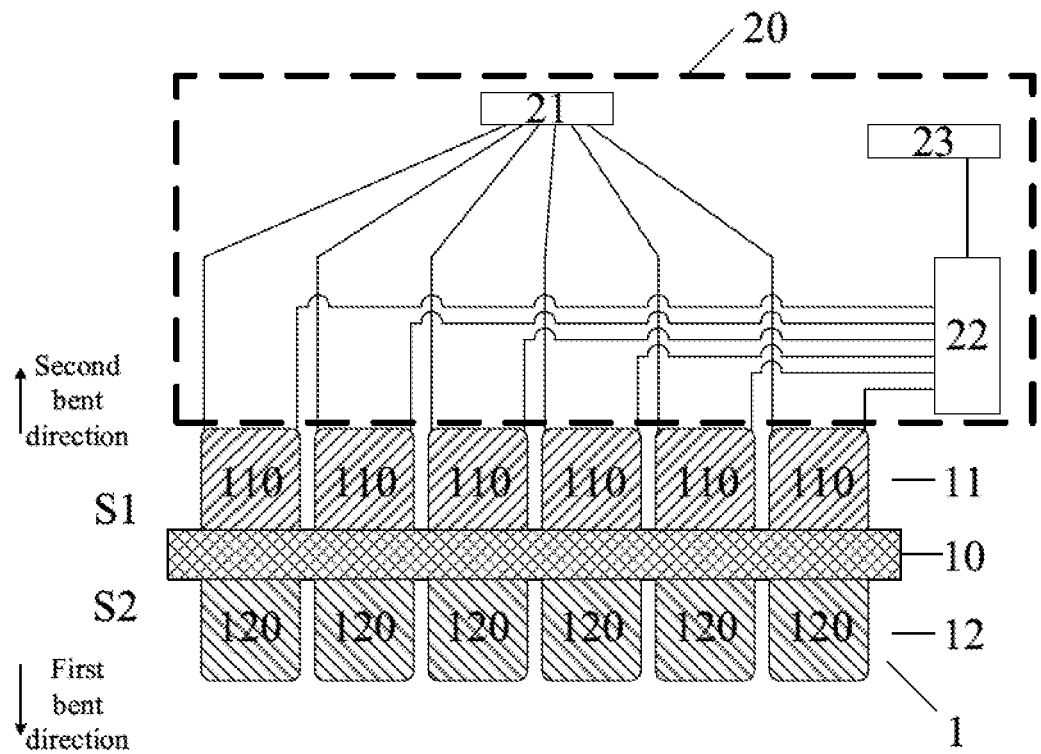
FIG. 6 is a schematic diagram illustrating the structure of a sensor for detecting a bending in some embodiments according to the present disclosure.
Figure 7:
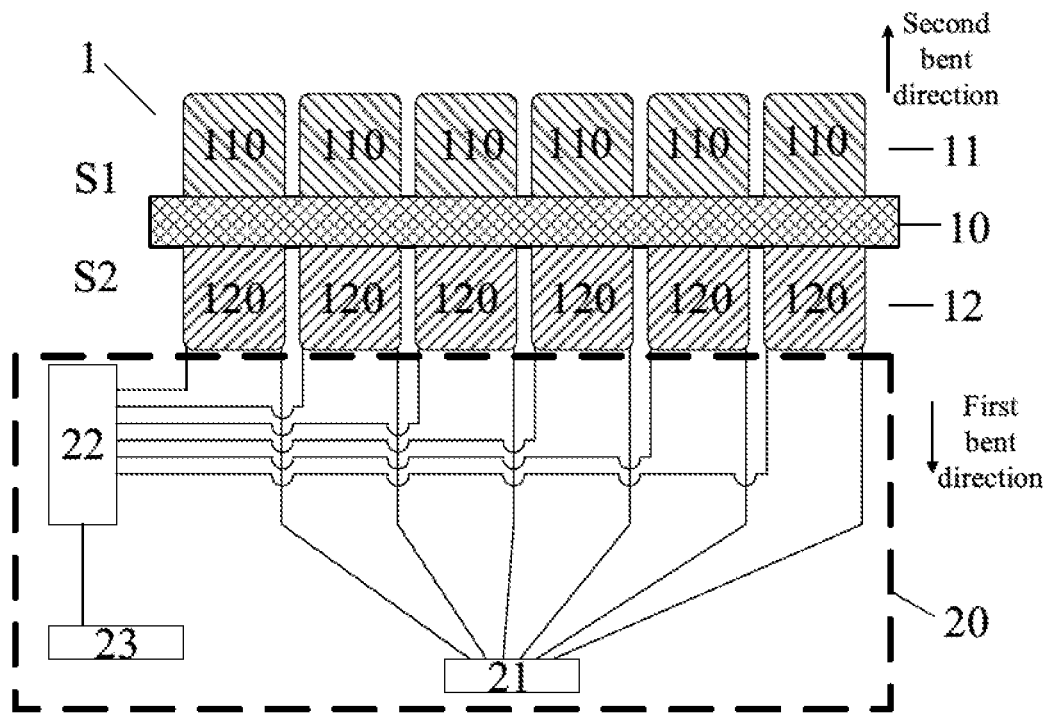
FIG. 7 is a schematic diagram illustrating the structure of a sensor for detecting a bending in some embodiments according to the present disclosure.

FIG. 6 is a schematic diagram illustrating the structure of a sensor for detecting a bending in some embodiments according to the present disclosure. Referring to FIG. 6, the sensor 1 in some embodiments includes a detection circuit 20 electrically connected to the plurality of first electrodes 110. In some embodiments, the detection circuit 20 is configured to detect a bending position and a bending direction by detecting an electrical signal from the at least two adjacent first electrodes of the plurality of first electrodes 110 electrically connected to each other in the state corresponding to the second configuration. FIG. 7 is a schematic diagram illustrating the structure of a sensor for detecting a bending in some embodiments according to the present disclosure. Referring to FIG. 7, the sensor 1 in some embodiments includes a detection circuit 20 electrically connected to the plurality of second electrodes 120. In some embodiments, the detection circuit 20 is configured to detect a bending position and a bending direction by detecting an electrical signal from the at least two adjacent second electrodes of the plurality of second electrodes 120 electrically connected to each other in the state corresponding to the third configuration, Optionally, the detection circuit 20 is configured to detect a bending position and a bending direction by detecting one or a combination of (1) a first electrical signal from the at least two adjacent first electrodes of the plurality of first electrodes 110 electrically connected to each other in the state corresponding to the second configuration, and (2) a second electrical signal from the at least two adjacent second electrodes of the plurality of second electrodes 120 electrically connected to each other in the state corresponding to the third configuration.

In some embodiments, the detection circuit 20 includes a first voltage terminal 21 and a short circuit detection terminal 22. The detection circuit 20 is configured to provide a first voltage level at the first voltage terminal 21, and is configured to scan the plurality of first electrodes 110 one by one with a first voltage signal transmitted from the first voltage terminal 21. When one of the plurality of first electrodes 110 is scanned, the one of the plurality of first electrodes 110 is provided with the first voltage level while the remainder of the plurality of first electrodes 110 remain at a voltage level different from the first voltage level, e.g., remain at ground voltage level. Thus, when the plurality of first electrodes 110 are insulated from each other (e.g., spaced apart from each other), at any moment when the plurality of first electrodes 110 are scanned with the first voltage signal, only a single one of the plurality first electrodes 110 is detected to have a first voltage level. When at least two adjacent first electrodes of the plurality of first electrodes 110 are electrically connected to each other, when any one of the at least two adjacent first electrodes is scanned with the first voltage signal, all of the at least two adjacent first electrodes are detected to have the first voltage level.

In some embodiments, the short circuit detection terminal 22 is connected to the plurality of first electrodes 110, and is configured to detect voltage levels at the plurality of first electrodes 110. When, at any moment when the plurality of first electrodes 110 are scanned with the first voltage signal, only a single one of the plurality first electrodes 110 is detected to have the first voltage level, it can be determined that the flexible base substrate 10 is substantially unbent, and the sensor 1 is in the first configuration. When at least two adjacent first electrodes are detected to have the first voltage level at the same time during the scanning process, it can be determined that a portion of the flexible base substrate 10 corresponding to the at least two adjacent first electrodes having the first voltage level at the same time are in the first bent state bent toward the first bent direction, and the sensor is in the second configuration.

Figure 8:
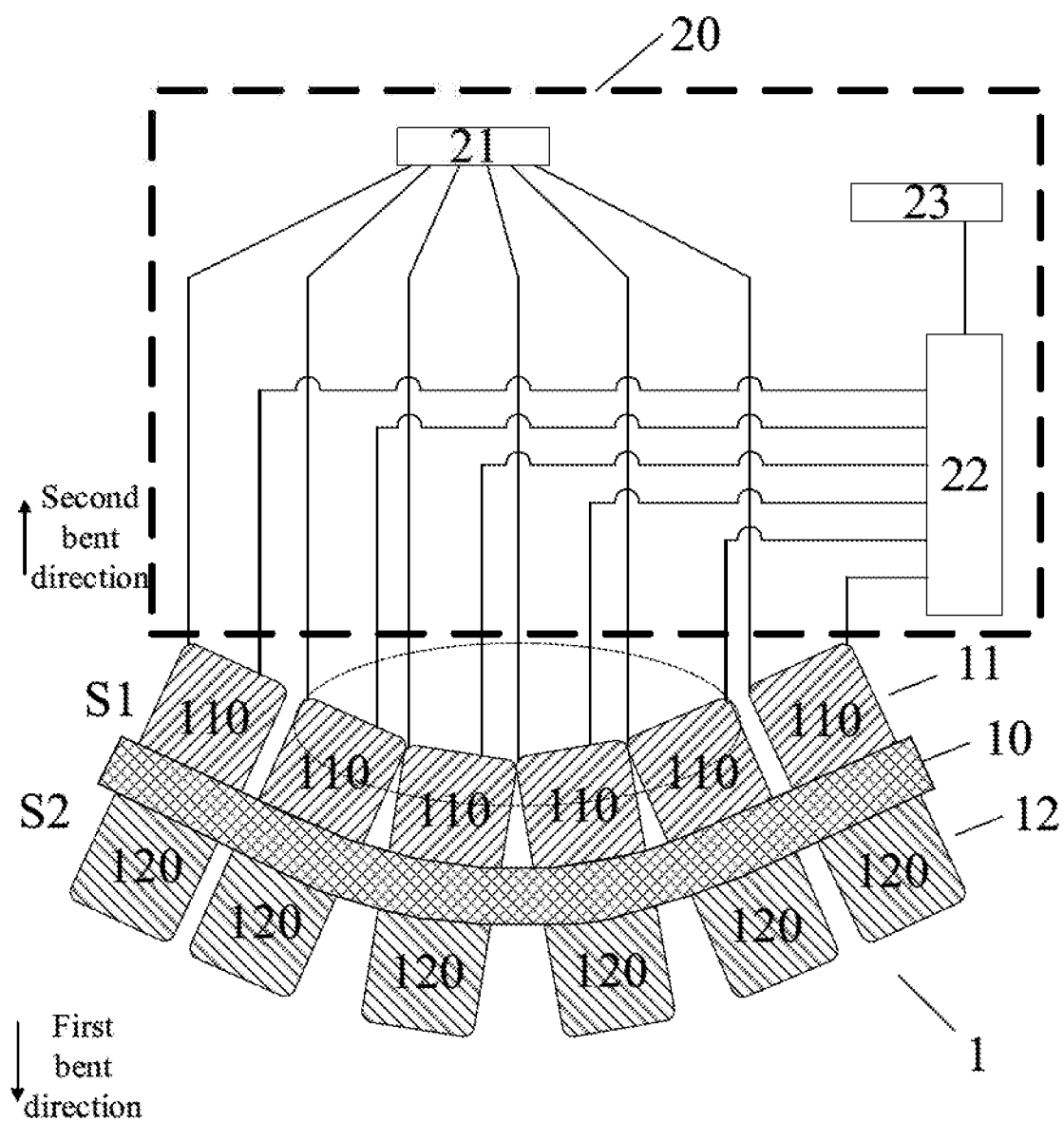
FIG. 8 is a schematic diagram illustrating the structure of a sensor for detecting a bending in a second configuration in some embodiments according to the present disclosure.

FIG. 8 is a schematic diagram illustrating the structure of a sensor for detecting a bending in a second configuration in some embodiments according to the present disclosure. Referring to FIG. 8, the sensor 1 is in a second configuration corresponding to the flexible base substrate 10 in a first bent state in which a portion of the flexible base substrate 10 is bent toward the first bent direction. Four adjacent first electrodes (the ones encircled by the dotted line) of the plurality of first electrodes 110 are electrically connected to (e.g., in contact with) each other. When any one of the four adjacent first electrodes is scanned with the first voltage signal, the short circuit detection terminal 22 detects the first voltage level in all four adjacent first electrodes. Accordingly, the bending direction of the flexible base substrate 10 can be determined to be the first bent direction, and the bending position of the flexible base substrate 10 can be determined based on the positions of the adjacent four first electrodes.

In some embodiments, the detection circuit 20 is configured to provide a first voltage level at the first voltage terminal 21, and is configured to scan the plurality of second electrodes 120 one by one with a first voltage signal transmitted from the first voltage terminal 21. When one of the plurality of second electrodes 120 is scanned, the one of the plurality of second electrodes 120 is provided with the first voltage level while the remainder of the plurality of second electrodes 120 remain at a voltage level different from the first voltage level, e.g., remain at ground voltage level, Thus, when the plurality of second electrodes 120 are insulated from each other (e.g., spaced apart from each other), at any moment when the plurality of second electrodes 120 are scanned with the first voltage signal, only a single one of the plurality second electrodes 120 is detected to have a first voltage level. When at least two adjacent second electrodes of the plurality of second electrodes 120 are electrically connected to each other, when any one of the at least two adjacent second electrodes is scanned with the first voltage signal, all of the at least two adjacent second electrodes are detected to have the first voltage level.

In some embodiments, the short circuit detection terminal 22 is connected to the plurality of second electrodes 120, and is configured to detect voltage levels at the plurality of second electrodes 120. When, at any moment when the plurality of second electrodes 120 are scanned with the first voltage signal, only a single one of the plurality second electrodes 120 is detected to have the first voltage level, it can be determined that the flexible base substrate 10 is substantially unbent, and the sensor 1 is in the first configuration. When at least two adjacent second electrodes are detected to have the first voltage level at the same time during the scanning process, it can be determined that a portion of the flexible base substrate 10 corresponding to the at least two adjacent second electrodes having the first voltage level at the same time are in the second bent state bent toward the second bent direction, and the sensor 1 is in the third configuration.

Figure 9:
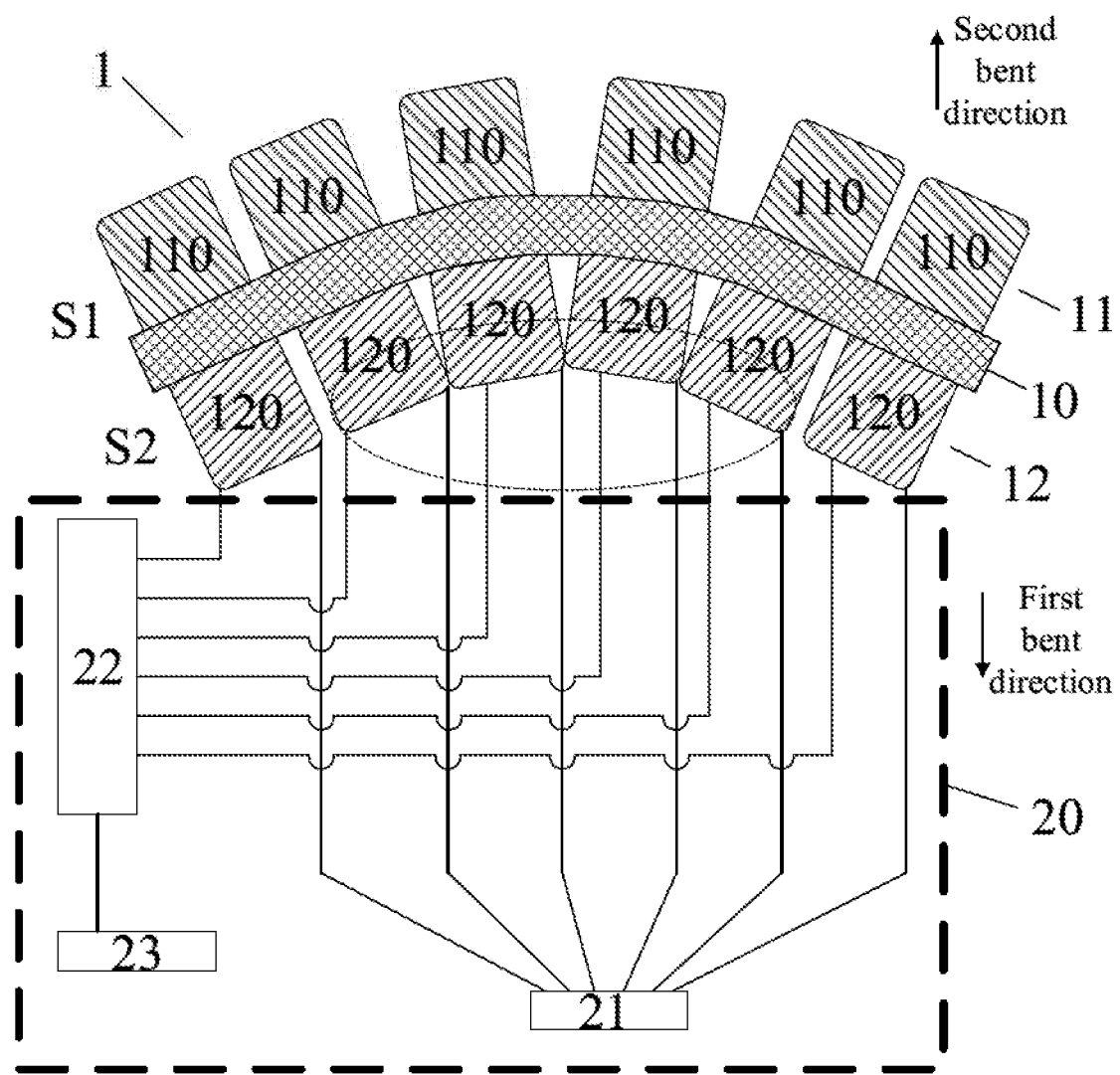
FIG. 9 is a schematic diagram illustrating the structure of a sensor for detecting a bending in a third configuration in some embodiments according to the present disclosure.

FIG. 9 is a schematic diagram illustrating the structure of a sensor for detecting a bending in a third configuration in some embodiments according to the present disclosure. Referring to FIG. 9, the sensor 1 is in a third configuration corresponding to the flexible base substrate 10 in a second bent state in which a portion, of the flexible base substrate 10 is bent toward the second bent direction. Four adjacent second electrodes (the ones encircled by the dotted line) of the plurality of second electrodes 120 are electrically connected to (e.g., in contact with) each other. When any one of the four adjacent second electrodes is scanned with the first voltage signal, the short circuit detection terminal 22 detects the first voltage level in all four adjacent second electrodes. Accordingly, the bending direction of the flexible base substrate 10 can be determined to be the second bent direction, and the bending position of the flexible base substrate 10 can be determined based on the positions of the adjacent four second electrodes.

Optionally, the first voltage signal is a high voltage signal, and the first voltage level is a high voltage level.

Referring to FIG. 6 and FIG. 8, the detection circuit 20 in some embodiments further includes a memory 23 storing relative positions of the plurality of first electrodes 110. Optionally, the detection circuit 20 is configured to determine the bending position of the first bending toward the first bent direction based on the voltage levels detected at the plurality of first electrodes 110 and the relative positions of the plurality of first electrodes 110. In one example, the bending position of the flexible base substrate 10 can be determined based on the positions of the at least two adjacent first electrodes electrically connected to each other, and relative positions of the at least two adjacent first electrodes electrically connected to each other retrieved from the memory.

Referring to FIG. 7 and FIG. 9, the detection circuit 20 in some embodiments further includes a memory 23 storing relative positions of the plurality of second electrodes 120. Optionally, the detection circuit 20 is configured to determine the bending position of the second bending toward the second bent direction based on the voltage levels detected at the plurality of second electrodes 120 and the relative positions of the plurality of second electrodes 120. In one example, the bending position of the flexible base substrate 10 can be determined based on the positions of the at least two adjacent second electrodes electrically connected to each other, and relative positions of the at least two adjacent second electrodes electrically connected to each other retrieved from the memory.

In some embodiments, the bending in the first electrode layer 11 and the second electrode layer 12 may be detected using an integrated detection circuit. In one example, the integrated detection circuit is configured to provide a first voltage level at the first voltage terminal 21, and is configured to scan the plurality of first electrodes 110 one by one with the first voltage signal transmitted from the first voltage terminal 21, and scan the plurality of second electrodes 120 one, by one with the first voltage signal transmitted from the first voltage terminal 21. The integrated detection circuit further include the short circuit detection terminal 22. The short circuit detection terminal 22 in the integrated detection circuit is connected to the plurality of first electrodes 110 and the plurality of second electrodes 120, and is configured to detect voltage levels at the plurality of first electrodes 110 and the plurality of second electrodes 120.

Various appropriate detection methods may be used for detecting the bending position and the bending direction of the flexible base substrate 10. As discussed above, the first electrical signal may be a current signal. In one example, when the plurality of first electrodes 110 are insulated from each other, no current is detected between any two first electrodes of the plurality of first electrode 110. When at least two adjacent first electrodes of the plurality of first electrodes 110 are electrically connected to each other, a current flow between any pair of the at least two adjacent first electrodes can be detected, thereby determining the bending position of the flexible base substrate 10 toward the first bent direction. In another example, when the plurality of second electrodes 120 are insulated from each other, no current is detected between any two second electrodes of the plurality of second electrode 120. When at least two adjacent second electrodes of the plurality of second electrodes 120 are electrically connected to each other, a current flow between any pair of the at least two adjacent second electrodes can be detected, thereby determining the bending position of the flexible base substrate 10 toward the second bent direction.

Figure 10:
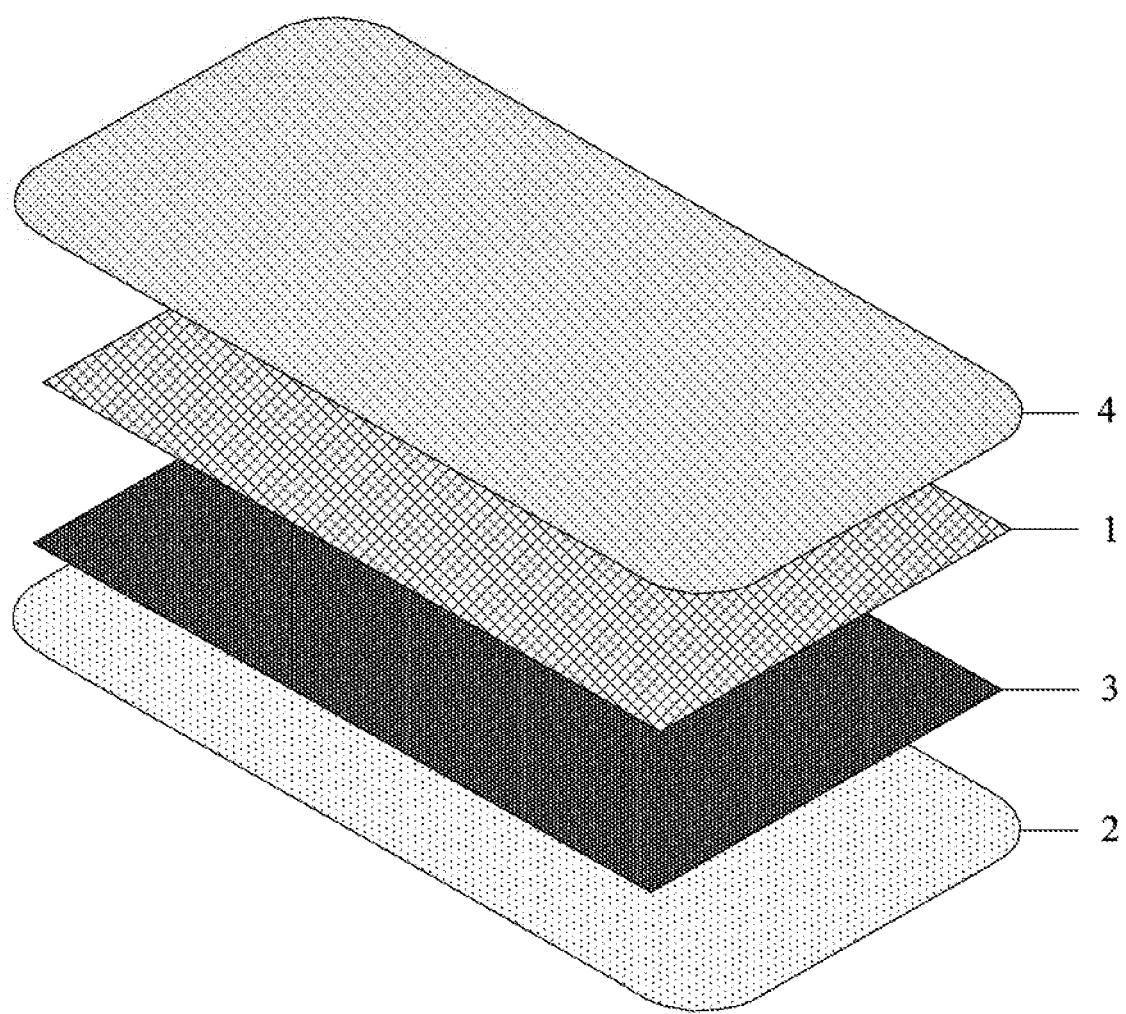
FIG. 10 is a schematic diagram illustrating the structure of a flexible display apparatus in some embodiments according to the present disclosure.

In another aspect, the present disclosure provides a flexible display apparatus having a sensor for detecting a bending described herein. When the flexible display apparatus is bent, the flexible base substrate of the sensor bends at a corresponding bending position and toward a same bending direction. By having a sensor in the present flexible display apparatus, the bending action in the flexible display apparatus can be accurately and sensitively detected by detecting the bending action in the flexible base substrate of the sensor. Optionally, the flexible display apparatus is a flexible liquid crystal display apparatus. Optionally, the flexible display apparatus is a flexible organic light emitting diode display apparatus. Optionally, the flexible display apparatus is a flexible electrophoretic display apparatus. Examples of appropriate flexible display apparatuses include, but are not limited to, an electronic paper, a mobile phone, a tablet computer, a television, a monitor, a notebook computer, a digital album, a GPS, etc, FIG. 10 is a schematic diagram illustrating the structure of a flexible display apparatus in some embodiments according to the present disclosure. Referring to FIG. 10, the flexible display apparatus in some embodiments includes a third flexible base substrate 2, a display unit 3 on the third flexible base substrate 2, a sensor 1 on a side of the display unit 3 distal to the third flexible base substrate 2, and a flexible touch panel 4 on a side of the sensor 1 distal to the display unit 3.

Optionally, the display unit 3 is a liquid crystal display unit having a plurality of thin film transistors for respectively driving light emission in a plurality of subpixels. The liquid crystal display unit in each subpixel includes a common electrode, a pixel electrode and a liquid crystal molecule layer sandwiched between two opposing substrates.

Optionally, the display unit 3 is an organic light emitting display unit having a plurality of organic light emitting diodes respectively in a plurality of subpixels, and a plurality of thin film transistors for respectively driving light emission in the plurality of organic light emitting diodes. Each of the plurality of organic light emitting diodes in one of the plurality of subpixels includes a cathode, and anode, and an organic light emitting layer between the cathode and the anode. Optionally, the flexible display apparatus further includes an encapsulating layer on a side of the display unit 3 distal to the third flexible base substrate 2 ands encapsulating the display unit 3. Optionally, the sensor 1 is on a side of the encapsulating layer distal to the display unit 3.

Optionally, the flexible display apparatus is a user-interactive flexible display apparatus.

In another aspect, the present disclosure provides a method of detecting a bending in a flexible display apparatus. In some embodiments, the method includes providing the sensor for detecting a bending described herein in the flexible display apparatus; scanning the plurality of first electrodes one by one with a first voltage signal; and detecting voltage levels of the plurality of first electrodes. Optionally, a single one of the plurality first electrodes is detected to have a first voltage level at any moment when the plurality of first electrodes are scanned with the first voltage signal, and the flexible base substrate is determined to be in the substantially unbent state. Accordingly, the flexible display apparatus is also determined to be in the substantially unbent state. Optionally, at least two adjacent first electrodes of the plurality of first electrodes are detected to have the first voltage level when the plurality of first electrodes are scanned with the first voltage signal, and the first flexible base substrate is determined to be in the first bent state. Accordingly, a bending position corresponding to the first bent direction can be determined based on the relative positions of the at least two adjacent first electrodes.

In some embodiments, the sensor for detecting a bending further includes a second flexible base substrate, and a second electrode layer on a side of the second flexible base substrate, insulated from the first electrode layer, and including an array of a plurality of second electrodes configured to detect a second bending toward a second bent direction relative to the surface of the second flexible base substrate.

Optionally, a single one of the plurality second electrodes is detected to have a first voltage level at any moment when the plurality of second electrodes are scanned with the first voltage signal, and the flexible base substrate is determined to be in the substantially unbent state. Accordingly, the flexible display apparatus is also determined to be in the substantially unbent state. Optionally, at least two adjacent second electrodes of the plurality of second electrodes are detected to have the first voltage level when the plurality of second electrodes are scanned with the first voltage signal, and the second flexible base substrate is determined to be in the second bent state. Accordingly, a bending position corresponding to the second bent direction can be determined based on the relative positions of the at least two adjacent second electrodes.

Optionally, the first voltage level is a high voltage level provided by the first voltage signal.

Optionally, the second flexible base substrate and the first flexible base substrate are integrated as a single flexible base substrate.

In another aspect, the present disclosure provides a method of fabricating a sensor for detecting a bending. In some embodiments, the method includes forming a first electrode layer on a side of a first flexible base substrate. Optionally, the step of forming the first electrode layer includes forming an array of a plurality of first electrodes. The plurality of first electrodes are formed so that they are insulated from each other when the first flexible base substrate is substantially unbent, and at least two adjacent first electrodes of the plurality of first electrodes are electrically connected to each other when at least a portion of the first flexible base substrate is bent toward the first bent direction. When the first flexible base substrate is substantially unbent, the plurality of first electrodes are formed so that they are spaced apart by a first gap. Optionally, the first gap has an average gap distance d1 in a range of approximately 10 μm to approximately 1 mm, e.g., approximately 10 μm to approximately 100 μm, approximately 100 μm to approximately 200 μm, approximately 200 μm to approximately 400 μm, approximately 400 μm to approximately 600 μm, approximately 600 μm to approximately 800 μm, and approximately 800 μm to approximately 1 mm.

In some embodiments, the method further includes forming a second electrode layer on a side of a second flexible base substrate. Optionally, the step of forming the second electrode layer includes forming an array of a plurality of second electrodes. The plurality of second electrodes are formed so that they are insulated from each other when the second flexible base substrate is substantially unbent, and at least two adjacent second electrodes of the plurality of second electrodes are electrically connected to each other when at least a portion of the second flexible base substrate is bent toward the second bent direction. When the second flexible base substrate is substantially unbent, the plurality of second electrodes are formed so that they are spaced apart by a second gap. Optionally, the second gap has an average gap distance d2 in a range of approximately 10 μm to approximately 1 mm, e.g., approximately 10 μm to approximately 100 μm, approximately 100 μm to approximately 200 μm, approximately 200 μm to approximately 400 μm, approximately 400 μm to approximately 600 μm, approximately 600 μm to approximately 800 μm, and approximately 800 μm to approximately 1 mm. Optionally, the second electrode layer is formed to be insulated from the first electrode layer.

Optionally, the method includes forming the first electrode layer and the second electrode layer on a same flexible base substrate. The first electrode layer is formed on a first side of the flexible base substrate, and the second electrode layer is formed on a second side different from the first side of the flexible base substrate. Optionally, the second side is opposite to the first side.

In some embodiments, the method further includes forming a detection circuit, including forming a first voltage terminal connected to the plurality of first electrodes and a short circuit detection terminal connected to the plurality of first electrodes. The first voltage terminal is formed to provide a first voltage signal, and the detection circuit is configured to scan the plurality of first electrodes one by one with a first voltage signal transmitted from a first voltage terminal. The short circuit detection terminal is formed to detect voltage levels at the plurality of first electrodes. Option ally, the first voltage terminal is formed to be connected to the plurality of second electrodes and the short circuit detection terminal is formed to be connected to the plurality of second electrodes. The first voltage terminal is formed to provide a first voltage signal, and the detection circuit is configured to scan the plurality of second electrodes one by one with a first voltage signal transmitted from a first voltage terminal. The short circuit detection terminal is formed to detect voltage levels at the plurality of second electrodes.

The foregoing description of the embodiments f the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A sensor for detecting a bending in a flexible display apparatus, comprising:
   a first flexible base substrate;
   a first electrode layer on a side of the first flexible base substrate and comprising an array of a plurality of first electrodes configured to detect a first bending toward a first bent direction relative to a surface of the first flexible base substrate; and
   a detection circuit electrically connected to the plurality of first electrodes;
   wherein the sensor has a first configuration corresponding to the first flexible base substrate in a substantially unbent state and a second configuration corresponding to the first flexible base substrate in a first bent state in which at least a portion of the first flexible base substrate is bent toward the first bent direction;
   the plurality of first electrodes are insulated from each other in a state corresponding to the first configuration; and
   at least two adjacent first electrodes of the plurality of first electrodes are electrically connected to each other in a state corresponding to the second configuration
   wherein the detection circuit is configured to detect a bending position and a bending direction by detecting an electrical signal from the at least two adjacent first electrodes of the plurality of first electrodes electrically connected to each other in the state corresponding to the second configuration;
   wherein the detection circuit comprises a first voltage terminal and a short circuit detection terminal;
   the detection circuit is configured to scan the plurality of first electrodes one by one with a first voltage signal transmitted from the first voltage terminal; and the short circuit detection terminal is configured to detect voltage levels at the plurality of first electrodes.

2. The sensor of claim 1, wherein the plurality of first electrodes are a plurality of first electrode probes, each of which extending away from the first side of the first flexible base substrate;
the plurality of first electrode probes are spaced apart from each other in the state corresponding to the first configuration; and
at least two adjacent first electrode probes of the plurality of first electrode probes are in contact with each other in the state corresponding to the second configuration.

3. The sensor of claim 1, wherein the detection circuit further comprises a memory storing relative positions of the plurality of first electrodes; and
the detection circuit is configured to determine the bending position of the first bending toward the first bent direction based on the voltage levels detected at the plurality of first electrodes and the relative positions of the plurality of first electrodes.

4. The sensor of claim 1, further comprising
a second flexible base substrate; and
a second electrode layer on a side of the second flexible base substrate, insulated from the first electrode layer, and comprising an array of a plurality of second electrodes configured to detect a second bending toward a second bent direction relative to a surface of the second flexible base substrate;
wherein the sensor has a third configuration corresponding to the second flexible base substrate in a second bent state in which at least a portion of the second flexible base substrate is bent toward the second bent direction;
the plurality of second electrodes are insulated from each other in a state corresponding to the first configuration; and
at least two adjacent second electrodes of the plurality of second electrodes are electrically connected to each other in a state corresponding to the third configuration.

5. The sensor of claim 4, wherein the plurality of second electrodes are a plurality of second electrode probes, each of which extending away from a second side of the second flexible base substrate;
the plurality of second electrode probes are spaced apart from each other in the state corresponding to the first configuration;
at least two adjacent second electrode probes of the plurality of second electrode probes are in contact with each other in the state corresponding to the third configuration.

6. The sensor of claim 4, wherein the second flexible base substrate and the first flexible base substrate are integrated as a single flexible base substrate; and
the first electrode layer and the second electrode layer are on two opposite sides of the single flexible base substrate.

7. The sensor of claim 4, further comprising a detection circuit electrically connected to the plurality of first electrodes and the plurality of second electrodes;
wherein the detection circuit is configured to detect a bending position and a bending direction by detecting one or a combination of a first electrical signal from the at least two adjacent first electrodes of the plurality of first electrodes electrically connected to each other in the state corresponding to the second configuration, and a second electrical signal from the at least two adjacent second electrodes of the plurality of second electrodes electrically connected to each other in the state corresponding to the third configuration.

8. The sensor of claim 4, wherein the plurality of first electrodes are insulated from each other in a state corresponding to the third configuration; and
the plurality of second electrodes are insulated from each other in a state corresponding to the second configuration.

9. The sensor of claim 4, wherein the second bent direction is substantially opposite to the first bent direction.

10. The sensor of claim 1, wherein the first flexible base substrate is a flexible film.

11. A flexible display apparatus, comprising the sensor of claim 1.

12. The flexible display apparatus of claim 11, further comprising a display unit and a flexible touch panel on the display unit;
wherein the sensor is between the flexible touch panel and the display unit.

13. A sensor for detecting a bending in a flexible display apparatus, comprising:
a first flexible base substrate;
a first electrode layer on a side of the first flexible base substrate and comprising an array of a plurality of first electrodes configured to detect a first bending toward a first bent direction relative to a surface of the first flexible base substrate;
a second flexible base substrate;
a second electrode layer on a side of the second flexible base substrate, insulated from the first electrode layer, and comprising an array of a plurality of second electrodes configured to detect a second bending toward a second bent direction relative to a surface of the second flexible base substrate; and
a detection circuit electrically connected to the plurality of first electrodes and the plurality of second electrodes;
wherein the sensor has a first configuration corresponding to the first flexible base substrate in a substantially unbent state and a second configuration corresponding to the first flexible base substrate in a first bent state in which at least a portion of the first flexible base substrate is bent toward the first bent direction;
the plurality of first electrodes are insulated from each other in a state corresponding to the first configuration; and
at least two adjacent first electrodes of the plurality of first electrodes are electrically connected to each other in a state corresponding to the second configuration;
wherein the sensor has a third configuration corresponding to the second flexible base substrate in a second bent state in which at least a portion of the second flexible base substrate is bent toward the second bent direction;
the plurality of second electrodes are insulated from each other in a state corresponding to the first configuration; and
at least two adjacent second electrodes of the plurality of second electrodes are electrically connected to each other in a state corresponding to the third configuration;
wherein the detection circuit is configured to detect a bending position and a bending direction by detecting one or a combination of a first electrical signal from the at least two adjacent first electrodes of the plurality of first electrodes electrically connected to each other in the state corresponding to the second configuration, and a second electrical signal from the at least two adjacent second electrodes of the plurality of second electrodes electrically connected to each other in the state corresponding to the third configuration;
wherein the detection circuit comprises a first voltage terminal and a short circuit detection terminal;
the detection circuit is configured to scan the plurality of second electrodes one by one with a first voltage signal transmitted from the first voltage terminal; and
the short circuit detection terminal is configured to detect voltage levels at the plurality of second electrodes.

14. The sensor of claim 13, wherein the detection circuit further comprises a memory storing relative positions of the plurality of second electrodes; and
the detection circuit is configured to determine the bending position of the second bending toward the second bent direction based on the voltage levels detected at the plurality of second electrodes and the relative positions of the plurality of second electrodes.

15. A method of detecting a bending in a flexible display apparatus, comprising:
providing a sensor in the flexible display apparatus, wherein the sensor comprises a first flexible base substrate; and a first electrode layer on a side of the first flexible base substrate and comprising an array of a plurality of first electrodes configured to detect a first bending toward a first bent direction relative to a surface of the first flexible base substrate; wherein the sensor has a first configuration corresponding to the first flexible base substrate in a substantially unbent state and a second configuration corresponding to the first flexible base substrate in a first bent state in which at least a portion of the first flexible base substrate is bent toward the first bent direction; the plurality of first electrodes are insulated from each other in a state corresponding to the first configuration; and at least two adjacent first electrodes of the plurality of first electrodes are electrically connected to each other in a state corresponding to the second configuration;
scanning the plurality of first electrodes one by one with a first voltage signal; and
detecting voltage levels of the plurality of first electrodes;
wherein a single one of the plurality first electrodes is detected to have a first voltage level at any moment when the plurality of first electrodes are scanned with the first voltage signal, and the first flexible base substrate is determined to be in the substantially unbent state; and
at least two adjacent first electrodes of the plurality of first electrodes are detected to have the first voltage level when the plurality of first electrodes are scanned with the first voltage signal, and the first flexible base substrate is determined to be in the first bent state thereby detecting a bending position corresponding to the first bent direction.

16. The method of claim 15, wherein the first voltage level is a high voltage level provided by the first voltage signal.

17. The method of claim 15, wherein the sensor further comprises a second flexible base substrate, and a second electrode layer on a side of the second flexible base substrate, insulated from the first electrode layer, and comprising an array of a plurality of second electrodes configured to detect a second bending toward a second bent direction relative to a surface of the second flexible base substrate;
wherein the sensor has a third configuration corresponding to the second flexible base substrate in a second bent state in which at least a portion of the second flexible base substrate is bent toward the second bent direction;
the plurality of second electrodes are insulated from each other in a state corresponding to the first configuration; and
at least two adjacent second electrodes of the plurality of second electrodes are electrically connected to each other in a state corresponding to the third configuration;
the method further comprising:
scanning the plurality of second electrodes one by one with the first voltage signal; and
detecting voltage levels of the plurality of second electrodes;
wherein a single one of the plurality second electrodes is detected to have the first voltage level at any moment when the plurality of second electrodes are scanned with the first voltage signal, and the second flexible base substrate is determined to be in the substantially unbent state; and
at least two adjacent second electrodes of the plurality of second electrodes are detected to have the first voltage level when the plurality of second electrodes are scanned with the first voltage signal, and the second flexible base substrate is determined to be in the second bent state thereby detecting a bending position corresponding to the second bent direction.

18. The method of claim 17, wherein the second flexible base substrate and the first flexible base substrate are integrated as a single flexible base substrate; and
the first electrode layer and the second electrode layer are formed on two opposite sides of the single flexible base substrate.

* * * * *